Sept. 8, 1959 T. B. HORGAN 2,903,582

DETECTOR EMPLOYING RADIANT ENERGY TRANSMISSION

Filed Aug. 30, 1956 3 Sheets-Sheet 1

INVENTOR.
THOMAS B. HORGAN.
BY Alden D. Redfield
Warren Kunz
ATTORNEYS.

DETECTOR EMPLOYING RADIANT ENERGY TRANSMISSION

Filed Aug. 30, 1956 3 Sheets-Sheet 2

INVENTOR.
THOMAS B. HORGAN
BY Alden D. Redfield
Warren Kunz
ATTORNEYS.

DETECTOR EMPLOYING RADIANT ENERGY TRANSMISSION

Filed Aug. 30, 1956 3 Sheets-Sheet 3

INVENTOR.
THOMAS B. HORGAN.
BY Alden D. Redfield
Warren Kunz
ATTORNEYS.

United States Patent Office 2,903,582

Patented Sept. 8, 1959

2,903,582

DETECTOR EMPLOYING RADIANT ENERGY TRANSMISSION

Thomas B. Horgan, Cincinnati, Ohio, assignor to Avco Manufacturing Corporation, Cincinnati, Ohio, a corporation of Delaware Application August 30, 1956, Serial No. 607,202

9 Claims. (Cl. 250—27)

The present invention relates broadly to a detector and more particularly to electronic equipment designed to demodulate an amplitude modulated input signal comprising a high frequency carrier wave which has been amplitude modulated at lower frequencies, such as audio frequencies.

More specifically the invention relates to a new type of detector having (1) means for producing radiant energy of an intensity proportionate to the amplitude of the carrier wave and (2) photosensitive means for receiving the radiant energy and converting it into a demodulated, filtered output wave.

Briefly stated, the preferred embodiment of the invention comprises a cathode-ray tube including electron beam deflection means and generating means for directing an electron beam against a phosphor coating on the tube face which emits luminous energy in a manner known in the art. A modulated high frequency input signal is impressed on the beam deflection means causing the electron beam and the resulting spot of light on the face of the tube to describe a closed path back and forth across the face of the tube from a centralized position of rest. Displacement of the beam is proportional to the amplitude of the input signal.

In this version of the invention the intensity of the electron beam remains constant and a light filter of graduated transmissivity is positioned in front of the face of the cathode-ray tube to intercept the light therefrom. A portion of the light is transmitted by the filter to photosensitive means, such as a photoelectric cell. The amount of light transmitted varies in proportion to the displacement of the beam from its position of rest. The photoelectric cell is of the type which passes an electric current in proportion to its energization by luminous energy. The photoelectric cell circuit is suitably filtered and develops a demodulated wave form faithfully representing the original input signal.

In other versions of the invention means is provided for varying the intensity of the electron beam whereby the energy emitted by the cathode-ray tube varies quantitatively in proportion to the amplitude of the modulated carrier wave. Here no light filter is provided and the light energy of varying intensity is delivered directly to the photosensitive means. By varying the intensity of the electron beam, it is possible, in certain applications, to eliminate the beam deflecting means. The resulting system will also function effectively as a detector.

It is within the purview of this invention to provide a detector capable of delivering either a half wave or a full wave demodulated signal, i.e. a demodulated wave generated by either the upper half of the carrier wave alone, or by both the upper and lower halves of the carrier wave, respectively. The present invention may also be used for split detection in which a single amplitude modulated input signal can be made to produce a plurality of entirely separate and independent demodulated output signals.

It is also within the teaching of the invention to provide a split detection system including a dual beam type cathode-ray tube having two electron beams one of which is varied in intensity and the other of which is of constant intensity. Both beams are simultaneously but oppositely deflected to deliver light alternately to each of a pair of photoelectric cells.

Use of a light filter can be eliminated in certain versions of the invention by use of a special cathode-ray tube having a phosphor coating of graduated density.

In view of the foregoing, it will be understood that it is broadly an object of this invention to provide an improved detector. It is also an object of the invention to provide a detector employing radiant energy transmission in which the output circuit of the detector does not influence or affect the input circuit of the detector.

A more specific object of the invention is to provide a detector for amplitude modulated signals employing a cathode-ray tube for generating a source of radiant energy and photosensitive device for receiving the radiant energy and converting it into a demodulated output signal.

A further object of the invention is provision of a detector employing a cathode-ray tube as a source of radiant energy and filtering means of graduated transmissivity which transmits to photosensitive means a radiant energy signal varying in intensity in proportion to the amplitude of the carrier wave.

Further objects of the invention are as follows:

(1) Provision of a detector having entirely separate outputs, loading of any one of which does not affect operation of the remaining outputs.

(2) Provision of a detector which faithfully demodulates an input signal without distortion.

(3) Provision of a cathode-ray tube type detector in which the decay time of the phosphor of the tube may be used to eliminate the radio frequency component of the carrier signal.

(4) Provision of special filters for use in conjunction with a cathode-ray tube type of detector whereby half wave, full wave, or split detection may be accomplished.

The novel features that I consider characteristic of my invention are set forth in the appended claims; the invention itself, however, both as to its organization and the method of operation, together with additional objects and advantages thereof, will best be understood from the following description of specific embodiments when read in conjunction with the accompanying drawings.

As set forth in this specification, the preferred embodiment of the invention utilizes light energy in the visible spectrum as a specific example of a commonly available form of radiant energy which can be employed. It should be understood, however, that the invention comprehends the provision of other forms of radiant energy generating means and photosensitive devices responsive to the output of such means. Thus the recitation of "light" or "luminous energy" as an illustrative form of radiant energy should not be understood to exclude other forms of radiant energy capable of being filtered, or modulated in intensity to produce the desired effect on photosensitive means.

Figure 1:
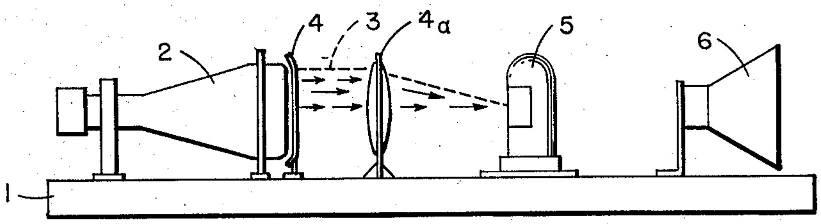
Figure 1 is a side elevational view of a detector employing the principles of this invention.

For a full understanding of the invention attention should first be directed to Figure 1 which discloses a chassis 1 supporting a cathode-ray tube 2 which produces a light source or beam suggested by lines 3. The light passes through a filter 4 of graduated transmissivity positioned in front of the face of cathode-ray tube 2. The light transmitted by the filter may be concentrated by optical means 4*a* on a photosensitive device such as a photoelectric cell 5. In a manner well known in the art, the cell passes current in proportion to the intensity of the light received. By a circuit to be disclosed, the light impulses received by the cell are converted into demodulated wave forms at lower frequency, such as audio frequency. For illustrative purposes a loud speaker 6 has been shown for producing sound at audio frequencies.

Figure 2:
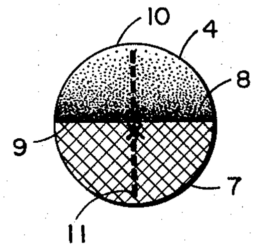
Figure 2 is a front view of a filter used in a detector such as shown in Figure 1 to accomplish half wave demodulation.

Shown in Figure 2 is one form of filter 4 which is particularly useful for half wave detection. It will be noted that the lower half of the filter, shown at 7, is completely opaque to the passage of light. The other half of the filter, indicated at 8, gradually increases in light transmissivity from zero (opaque) at junction 9 to one-hundred percent at 10 remote from the opaque half of the filter.

As will be disclosed, the light beam from the cathode-ray tube normally rests at the position marked "X" in Figure 2, in the opaque region of the filter close to junction 9 of the filter halves. This light beam moves along a closed linear path 11 in accordance with the amplitude and polarity of the incoming signal. It will be observed that path 11 lies half above and half below junction 9 so that the light beam emitted by the cathode-ray tube is transmitted by the filter during only one-half of its travel. Due to the graduated transmissivity of the filter, intensity of transmitted light increases in proportion to the displacement of the light beam from junction 9.

Figure 3:
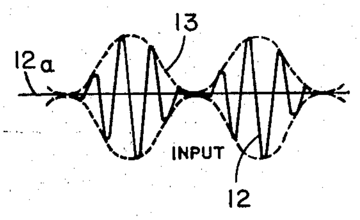
Figure 3 is a graphic representation of an amplitude modulated carrier wave and its modulation envelope such as constitutes the input of the detector shown in Figure 1.
Figure 4:
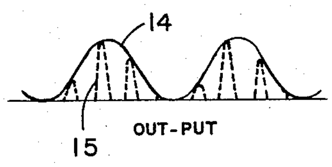
Figure 4 is a graphic representation of the demodulated output of the detector when functioning as a half wave detector.

The significance of the foregoing will be more fully understood with reference to Figures 3 and 4. Shown at 12 in Figure 3 is an amplitude modulated carrier wave varying positively and negatively above and below a central reference axis 12*a*. For illustrative purposes operation at 100% modulation has been shown with the modulation envelope 13 describing an audio frequency wave in accordance with which the modulation of the carrier signal was affected. The detector demodulates the signal shown in Figure 3 and yields a high fidelity audio frequency output signal, indicated graphically by curve 14 of Figure 4. This curve is defined by the upper half of the carrier wave, the lower half being rejected by the detector by virtue of the opaque half of the filter shown in Figure 2. The radio frequency components of the carrier wave may be filtered by conventional means or eliminated through the decay time of the phosphor coating of the cathode-ray tube as will be explained shortly.

Figures 5, 6, 7, 8:
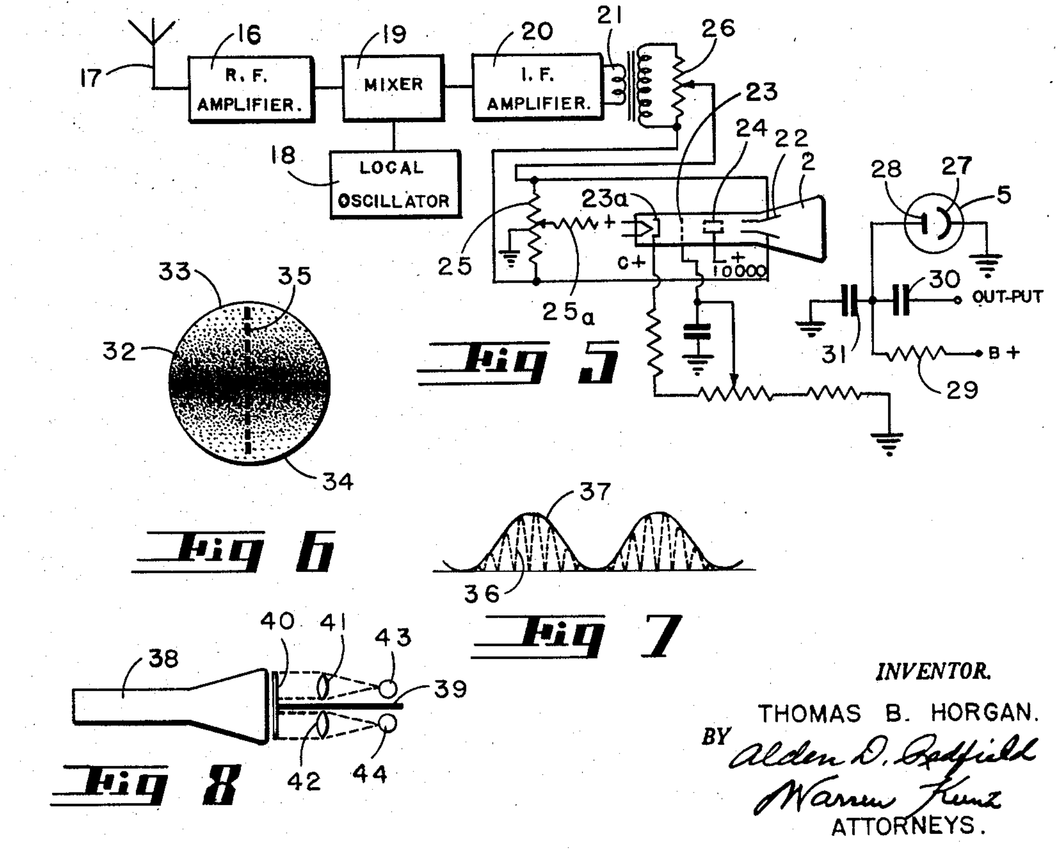
Figure 5 is a schematic wiring diagram of the detector shown in Figure 1.
Figure 6 is a front view of another filter which may be employed in the detector to accomplish either full wave detection or split detection.
Figure 7 is a graphic representation of the demodulated output signal from the detector when operating as a full wave detector.
Figure 8 is a schematic representation of a cathode-ray tube and a plurality of photosensitive devices arranged to deliver separate demodulated output signals.

Attention should now be directed to the circuit of Figure 5. To illustrate a typical use of the detector, there is shown in block diagram form a radio frequency amplifier 16 receiving an input signal from antenna 17. The output of the RF amplifier is combined with that of local oscillator 18 in mixer 19 and the resulting intermediate frequency wave is amplified in the IF amplifier 20. The output of this amplifier is supplied through transformer 21 to the input of beam deflection means 22 of cathode-ray tube 2. As will be understood by those skilled in the art the beam deflection means may comprise either electrostatic deflection plates or magnetic deflection coils for deflecting an electron beam in proportion to the output of the IF amplifier. Indicated at 23 and 23*a* are a grid and cathode for generating the electron beam and an ultor is shown at 24 for accelerating the beam toward the face of the tube.

Under normal conditions of operation the electron beam, when at rest, generates a small spot of light near the center of the face of the tube. Centralization of this light spot may be effected by adjusting the position of movable element 25*a*, which is positively charged, with respect to rheostat 25, the center of which is grounded. As the IF carrier potential is impressed on the deflecting means 22, alternately changing its polarity and E.M.F. in accordance with that of the carrier, the light spot is displaced from the central position. Absent horizontal beam deflecting means, the beam will trace a vertical closed path on the face of the tube as indicated at 11 in Figure 2. The greater the potential imposed on the beam deflecting means, the greater will be the displacement of the light spot from its central rest position. The maximum amplitude attained may be controlled by potentiometer 26 which will regulate the output of transformer 21.

Thus it will be observed that a light source of constant intensity is deflected by means 22 above and below a central rest position in proportion to the amplitude of the IF carrier. The output of tube 2 is a beam of light traced on a vertical line which may be intercepted by the filter shown in Figure 2. This filter obstructs passage of light generated by the beam in the course of its travel below the rest position and only passes light during movement of the beam above the rest position. The amount of the light transmitted is proportional to the displacement of the beam above the rest position. Thus the greater the displacement, the greater is the quantity of light passed through the filter. Stated differently, the light energy transmitted by the filter is proportional to the amplitude of the IF carrier wave above its horizontal reference axis.

Light transmitted by filter 4 is received by the photoelectric cell 5, as has been explained. This cell comprises a cathode 27 and an anode 28. The cell has a linear response to stimulation by light and will pass current in one direction only in an amount directly dependent upon the intensity of light impinging on the cathode. As will be understood by those skilled in the art, resistor 29 may be provided and capacitance coupling may be effected with subsequent amplifying stages through condenser 30. It is also desirable in some cases to by-pass the RF component of the demodulated signal to ground through filter condenser 31.

Condenser 31 may be eliminated by use of a phosphor on the cathode-ray tube having a relatively long decay time. The persistence of light emission can be made to correspond to carrier frequency, serving as an RF filter. This is particularly desirable since slow decay phosphors are relatively cheap.

From a review of the foregoing description and a study of Figure 4 it will be recognized that the demodulated signal is defined by the upper half of the modulated IF carrier; the lower half of the wave form is eliminated by the opaque half of the filter. It is possible, however, by use of a different type of filter to accomplish full wave detection. Such a filter is shown in Figure 6 and comprises a central opaque band 32 which gradually increases to 100% transmissivity at the top and bottom of the filters 33 and 34 respectively. Here again the rest position of the beam is indicated by "X" and the path generated by the light source is indicated by a straight vertical line 35. Again the line extends equally above and below the rest position "X" of the beam. This difference will be noted, however: Now both halves of the filter transmit light in an amount proportional to the displacement of the light source above and below the rest position. This means that the photoelectric cell receives energy almost continuously (except during the time that the beam passes the rest position) instead of one-half of the time, as when the filter of Figure 2 is employed. As a result the demodulated output wave is defined by all portions of the IF carrier, as illustrated graphically at 36 in Figure 7. The resulting demodulated wave 37 is necessarily a more faithful reproduction of the original AF signal.

In some instances it is desirable to obtain from one modulated input signal two or more entirely separate and distinct demodulated output signals. The present invention is ideally suited for such purposes as illustrated in Figure 8. Here is shown a cathode-ray tube 38 with an opaque divider 39 extending longitudinally from the face of the tube. Immediately in front of the tube is a filter 40 which may be of the type illustrated in Figure 6 with the plane of the divider corresponding to the opaque band 32. Lenses 41 and 42, may be provided to concentrate transmitted light on photocells 43 and 44 respectively. It will be readily understood that the photocell circuit shown in Figure 5 can be duplicated with respect to photocells 43 and 44 and in this way two entirely separate half wave demodulated signals, such as illustrated in Figure 4, can be obtained. This is particularly useful in AM receivers having automatic gain control since the loading of the AGC portion of the circuit will not reflect into or influence the AF output. Any number of separate outputs can be obtained by use of suitable optical means for dividing the output energy from the cathode-ray tube.

Figure 9:
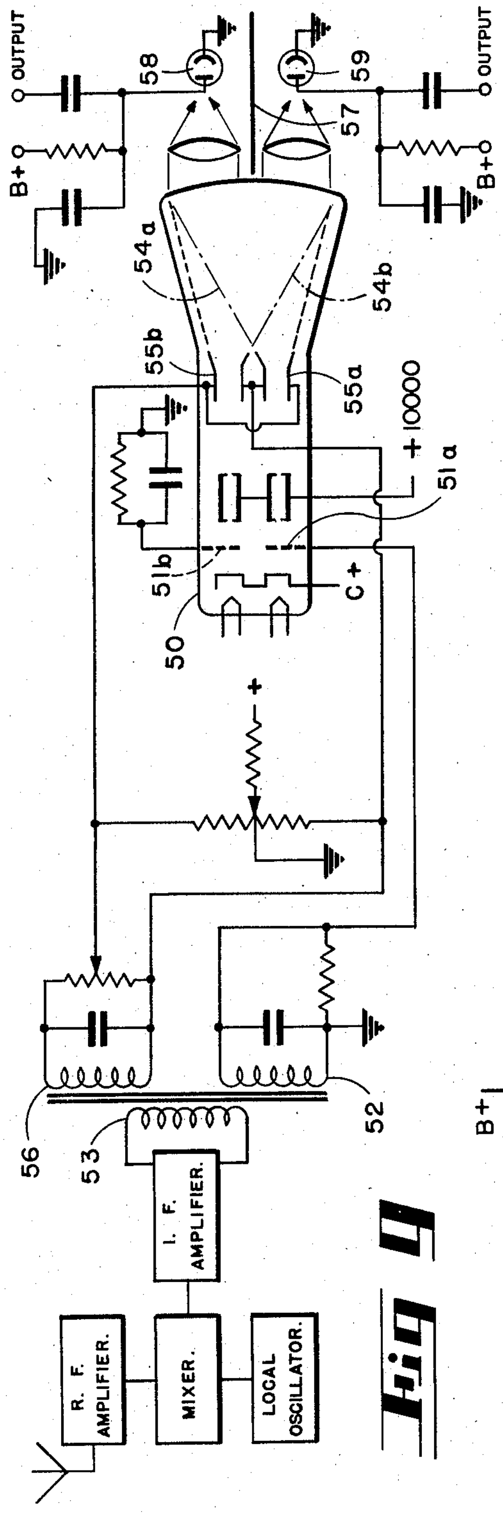
Figure 9 is a schematic wiring diagram of a detector arranged for split detection through modulation of the intensity of one electron beam of a dual beam type cathode-ray tube.

A modification of the invention which does not employ a light filter is illustrated in Figure 9. Again, for illustrative purposes, the detector has been shown in conjunction with an AM receiver. Here a dual beam cathode-ray tube 50 is employed, including a pair of control grids **51*a* and 51*b*. Grid 51*a* is energized by secondary 52 of IF output transformer 53. The other grid 51*b* is biased at a constant potential. By its construction the dual beam tube generates two entirely separate electron beams subject to independent intensity variation and deflection. Hence grid 51*a* varies the intensity of one of the beams, indicated schematically at 54*a*, proportional to IF carrier amplitude while the other beam 54*b* is maintained at constant intensity by 51*b*. Beam 54*b* is maintained at a constant intensity, called "average intensity," equal to that of beam 54*a* at the time it passes the midpoint of its travel. Below the midpoint, 54*a* is below average intensity and above the midpoint, it is above average intensity. Only at the midpoint does beam 54*a*** have average intensity.

Attention should now be directed to the deflection means **55*a* and 55*b* which deflect electron beams 54*a* and 54*b*, respectively. The deflection means are connected in parallel with transformer secondary 56 of the IF transformer. Deflection of the electron beams 54*a* and 54*b* from a central rest position is also proportionate to the amplitude of the IF carrier. It should be noted, however, that the bottom plate of deflection means 55*a* is connected to the top plate of deflection means 55*b*. As a result, the beams move opposite to one another. In other words, when beam 54*a* has reached its uppermost position, beam 54*b*** has reached its lowermost position, and vice versa. This is suggested diagrammatically in Figure 9 by corresponding dash and phantom lines.

An opaque divider 57 extends longitudinally from the face of the cathode-ray tube at the level of the rest position of the electron beams. Photoelectric cells 58 and 59 are positioned on opposite sides of the divider to receive radiant energy emanating from the phosphor coating of the cathode-ray tube on the associated side of the divider when stimulated by electron beams **54*a* and 54*b*. It will be observed, therefore, that the output of the photoelectric cells is a function of light energy generated successively by each electron beam. Thus, concentrating attention on photoelectric cell 58, it will be noted that only beam 54*a* of varying intensity delivers energy to cell 58 during the upper half of its travel since simultaneously the other electron beam is moving through the lower half of its travel. Both beams pass the level of divider 57 simultaneously and thereafter energy from the beam of constant intensity, 54*b*, is received by cell 58. During this time, the other beam of varying intensity, 54*a***, is describing the lower portion of its path.

In this version of the invention it is not important that the deflection of the beams be strictly proportional to the carrier wave. It is sufficient that with change of carrier polarity the beams are deflected from one side to the other of divider 57. It is important, however, that intensity of the beam **54*a*** varies proportionally above and below average intensity as the IF carrier goes above and below its horizontal reference axis.

Figure 12:
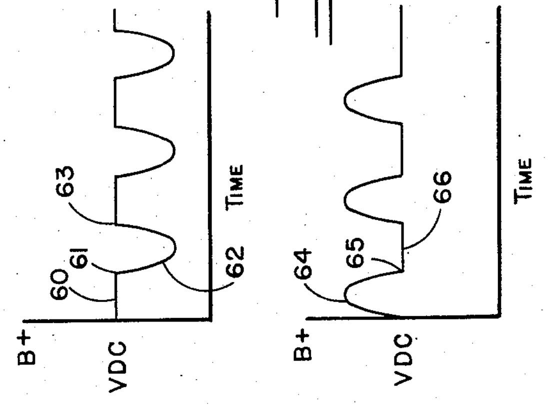
Figure 12 is a graphic representation of typical voltage variations at the coupling filters of the photoelectric cell circuits of Figure 9.

Figure 12 shows the D.C. voltage variation at the coupling condenser of the photoelectric cell circuits shown in Figure 9. First, with reference to the upper curve of Figure 12 it will be noted that the voltage remains substantially constant at 60 during the time that beam **54*b* energizes the photoelectric cell 58 at constant intensity. At point 61 the two oppositely moving beams simultaneously pass the divider 57. Curve 62 reflects the drop in voltage resulting from increased current flow through photoelectric cell 58 due to increase in intensity of illumination received from beam 54*a*. This beam, it will be remembered, has a gradually increasing and then a gradually decreasing intensity, always above the average intensity of beam 54*b*, during its travel above divider 57. As indicated at 63, constant illumination at average intensity is restored at the photoelectric cell by movement of beam 54*b* above divider 57**.

The lower curve of Figure 12 illustrates the voltage at the coupling condenser for the lower photoelectric cell circuit of Figure 9. Here, curve 64 indicates an increase and then a decrease in potential resulting from gradually decreasing, and then increasing flow of current through the photoelectric cell 59 incidental to energization by beam **54*a* of varying intensity. The beam decreases in intensity during its downward travel below divider 57 and then gradually increases in intensity during movement of the beam upward to divider 57. At all times the beam 54*a*, when below divider 57, has an intensity less than that of the beam 54*b*** which has constant average intensity.

At point 65 the beam of varying intensity passes above the divider 57 and the beam of constant average intensity moves below the divider, maintaining during its entire travel below the divider constant illumination of photoelectric cell 59 and hence constant potential at the coupling condenser, as indicated at 66.

By studying the curves of Figure 12 it will be noted that both curves include a D.C. component which is a consequence of energization of the photoelectric cells by the beam of constant average intensity. Superimposed on the D.C. component in each case is the demodulated carrier wave. With suitable filtering, each wave yields a demodulated wave at audio frequency. It will be apparent that both photoelectric cell circuits serve as half wave detectors.

Figure 10:
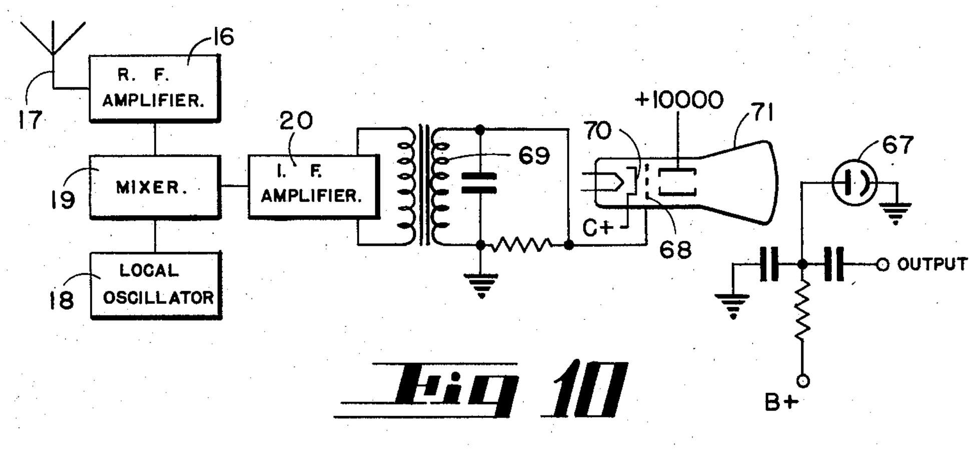
Figure 10 is a schematic wiring diagram of a detector arranged for half wave detection by means of electron beam intensity modulation without the use of a filter or beam deflection means.

Half wave detection may be accomplished without use of deflection means as illustrated in Figure 10. Here, a single photoelectric cell 67 is provided and the intensity of the cathode-ray tube beam is controlled by grid 68 and its associated transformer winding 69. By suitably biasing the cathode 70, the beam of cathode-ray tube 71 may be caused to cut off when the carrier crosses the reference axis. With such bias, the electron beam will only exist when the carrier is on the positive side of the axis, and the beam intensity increases in proportion to the amplitude of the positive carrier wave. Since the photoelectric cell only receives half of the carrier wave and passes current in proportion to its amplitude, half wave detection will be obtained.

Due to non-linearity of the cathode ray tube characteristic near cut-off, this system may be subject to low level distortion. For this reason, the other systems described in this application, which have zero distortion, are preferred, although it should be recognized that the system of Figure 10 can be utilized for demodulation purposes.

Figure 11:
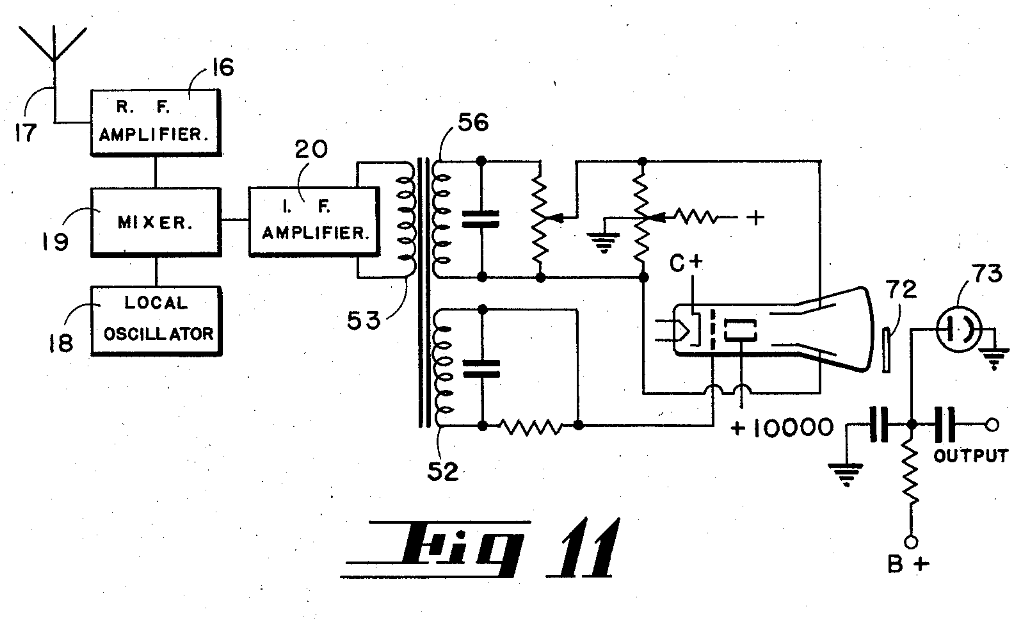
Figure 11 is a schematic wiring diagram of a half wave detector employing electron beam intensity modulation but no light filter.

Figure 11 shows another way to modulate the light intensity in order to obtain half wave detection. Energization of the deflection means is again accomplished as illustrated by Figure 9. Here, no mask is provided, but the lower half of the face of the cathode-ray tube is blanked out by an opaque barrier 72 so that only half of the light beam generated is delivered to photoelectric cell 73. The form of the resulting wave form resembles that shown in the upper curve of Figure 12.

Any suitable method may be used to make the filters. A simple way of making such a filter consists of gradually increasing the exposure of photographic film to light whereby the image produced on the film may be varied from fully opaque to clear. Stated differently the film may be gradually exposed so that at one extremity its transmissivity is zero and at the other extremity its transmissivity is unity or 100%. Another way of producing such a filter is by gradually coating, as by spray painting, the surface of an otherwise transparent member whereby its transmissivity is graduated from zero to 100%.

Use of a light filter can be avoided through provision of a special cathode-ray tube. If the coating of the tube is graduated in density so that gradually increasing light output results from increased amplitude of electron beam movement, the resulting effect at the photoelectric cell can be made identical with that produced by use of light filter. Obviously the phosphor would be distributed according to the type of detection to be accomplished, i.e. whether half wave or full wave, or split detection.

Having described a preferred embodiment of my invention, I claim:

1. A detector designed to receive amplitude modulated input signals comprising a cathode-ray tube including beam generating and beam deflection means, a circuit including said beam deflection means energized by said signals to deflect the electron beam of said cathode-ray tube above and below a normal centralized position of rest in proportion to the amplitude and polarity of the input signals, means for converting the electron beam into a correspondingly moving source of radiant energy, a filter intercepting the radiant energy output of said cathode-ray tube, the upper and lower portions of said filter increasing gradually in transmissivity from zero transmissivity in a region corresponding to the rest position of the electron beam, an opaque divider extending from the face of said electron tube in a direction parallel to its axis in a position to divide the upper and lower portions of said filter from each other, a pair of photoelectric tubes one of which is on each side of said divider in position to receive radiant energy transmitted through the associated half of said filter, and a circuit associated with each photoelectric tube for developing to usable strength the resulting half wave demodulated output signal passing through each photoelectric tube as a result of its stimulation by radiant energy received from said cathode-ray tube.

2. A detector designed to receive amplitude-modulated input signals comprising a dual beam cathode-ray tube including a pair of electron generating and beam-deflection means, a circuit including the first beam-generating means for varying beam intensity above and below average intensity in proportion to the amplitude of input signals above and below the central reference axis, respectively, a circuit including the other beam-generating means for maintaining the intensity of the other beam at constant average intensity, said beam-deflection means of the first and second beams being simultaneously energized by the input signals to deflect the electron beams along a path above and below a normal centralized position of rest where the intensity of both beams is average, deflection of the beams being opposite in sense and in proportion to the amplitude and polarity of the input signals, means for converting the electron beams into correspondingly moving sources of radiant energy varying in intensity correspondingly with the intensity of the electron beams, an opaque divider extending from the face of said cathode-ray tube in a direction generally parallel to its axis, the position of said divider corresponding to the centralized rest position of the electron beams so that the beams move above and below said divider in accordance with the polarity of the input signal, a photoelectric cell on each side of said divider in position to receive the radiant energy from said cathode-ray tube, and output circuits associated with said photoelectric cells for delivering separate and distinct half wave demodulated signals.

3. In combination in a detector supplied with amplitude modulated signals, means for generating a source of radiant energy of an intensity proportional to the amplitude of the input signals, means for deflecting the source of radiant energy in accordance with the polarity of the input signals, output circuits including a pair of photoelectric cells, and means for directing to each of said cells radiant energy from said generating means in accordance with the particular polarity of the input signal.

4. In combination in a detector supplied with amplitude modulated signals, means for generating a source of radiant energy, means for deflecting the source of radiant energy in accordance with the amplitude and polarity of the input signals, means for varying the intensity of the radiant energy in proportion to its deflection, and output circuits including a pair of photoelectric cells receiving radiant energy from said intensity varying means in accordance with the particular polarity of the input signal.

5. A detector for demodulating amplitude-modulated input signals comprising a pair of radiant energy-generating means, one of said means being of constant average intensity and the other said means varying in intensity above and below constant average intensity in proportion to the amplitude of the input signals above and below a central reference axis, respectively, a pair of output circuits each including photoelectric means for receiving radiant energy, and means for directing to each of said photosensitive means energy alternately from said first and second radiant energy-generating means as the polarity of the input signals changes.

6. A detector for demodulating amplitude-modulated signals comprising: means for generating a beam of electrons; means for deflecting said beam in accordance with the amplitude and the polarity of said modulated signals; means for converting said beam into a source of radiant energy; means for varying the intensity of said source in proportion to the amplitude of said modulated signals; an output circuit including radiant energy detector means; and means for alternately directing towards said radiant energy detector means the portions of said source of radiant energy due to positive modulated signals and to negative modulated signals, respectively.

7. The invention as defined in claim 6 wherein said means for generating a beam of electrons comprises a cathode-ray tube having electron emitting means, an intensity control grid and a fluorescent screen for converting said electron beam into said source of radiant energy; and wherein said means for varying the intensity of said source of radiant energy includes a grid-biasing circuit having an output circuit connected to said intensity control grid and an input circuit supplied with said modulated signals; and means for blocking radiant energy due to modulated signals of one polarity from said radiant energy detector means.

8. The invention as defined in claim 6 wherein said means for varying the intensity of said source includes a radiant energy filter intercepting said radiant energy source, said filter being graduated in transmissivity along the path of deflection of said beam.

9. A detector for demodulating amplitude modulated signals comprising: means for generating a beam of electrons, said means including a cathode-ray tube having electron emitting means, a control grid, an anode, electron deflection plates, and a fluorescent screen for converting said beam of electrons into a source of radiant energy; means applying said modulated signal to said deflection plates for deflecting said beam in accordance with the amplitude and polarity of said modulated signals; means for varying the intensity of said source of radiant energy in proportion to the amplitude of said modulated signals; and an output circuit including radiant energy detector means for receiving said radiant energy from said source, said radiant energy detector means comprising first and second photoelectric cells; means for energizing said first cell with radiant energy produced by positive modulated signals; and means for energizing said second cell with radiant energy produced by negative modulated signals.

References Cited in the file of this patent

UNITED STATES PATENTS

| | | |
|---|---|---|
| 2,183,717 | Keall | Dec. 19, 1939 |
| 2,199,066 | Bernstein | Apr. 30, 1940 |
| 2,654,027 | Baum | Sept. 29, 1953 |